United States Patent
Kim et al.

(10) Patent No.: US 8,468,643 B2
(45) Date of Patent: Jun. 25, 2013

(54) WARNING INDICATOR FOR USE WITH WIPER BLADES, METHOD OF OPERATING THE SAME AND WIPER BLADE WITH A WARNING INDICATOR

(75) Inventors: In-Kyu Kim, Gyeonggi-do (KR); Hong-Nam Kim, Gyeonggi-do (KR); Tae-Young Kim, Gyeonggi-do (KR)

(73) Assignees: ADM21 Co., Ltd., Gyeonggi-do (KR); ADM Technology Co., Ltd., Gyeonggi-do (KR); In-Kyu Kim, Gyeonggi-do (KR)

( * ) Notice: Subject to any disclaimer, the term of this patent is extended or adjusted under 35 U.S.C. 154(b) by 467 days.

(21) Appl. No.: 12/774,382

(22) Filed: May 5, 2010

(65) Prior Publication Data

US 2010/0293738 A1    Nov. 25, 2010

(30) Foreign Application Priority Data

May 19, 2009    (KR) .................. 10-2009-0043752

(51) Int. Cl.
*B60S 1/38*    (2006.01)

(52) U.S. Cl.
USPC .............. 15/250.361; 15/250.001; 15/257.01; 340/438; 340/457; 200/61.45 R

(58) Field of Classification Search
USPC ........... 15/250.001, 250.361, 250.43, 250.44, 15/250.48; 340/457.4, 438, 457, 679, 691.6, 340/815.45, 815.4, 425.5; 235/105, 128; 200/61.45 R, 61.52

See application file for complete search history.

(56) References Cited

U.S. PATENT DOCUMENTS

| | | | |
|---|---|---|---|
| 3,459,911 A * | 8/1969 | Fischer | 200/61.45 R |
| 5,640,786 A | 6/1997 | Buyayez | |
| 5,893,192 A * | 4/1999 | Lee | 15/250.201 |
| 6,057,660 A | 5/2000 | Meier et al. | |
| 6,555,772 B1 * | 4/2003 | Chou | 200/61.45 R |
| 2005/0285547 A1 * | 12/2005 | Piepgras et al. | 315/294 |

FOREIGN PATENT DOCUMENTS

| | | |
|---|---|---|
| DE | 3639831 A1 | 5/1988 |
| DE | 19620320 A1 | 11/1997 |
| DE | 10 2005 044667 A1 | 3/2007 |
| EP | 0691597 A1 | 1/1996 |
| FR | 2843083 A1 * | 2/2004 |

(Continued)

OTHER PUBLICATIONS

Reed switch, www.reed-switch-info.com, 2012.*

(Continued)

*Primary Examiner* — Mark Spisich
*Assistant Examiner* — Andrew A Horton
(74) *Attorney, Agent, or Firm* — Maier & Maier PLLC

(57) ABSTRACT

Various embodiments of a warning indicator for use with wiper blades are provided. In one embodiment, the warning indicator has a housing, a counting unit disposed in the housing, an indicating unit exposed on the housing and an electrical source. The housing is coupled to an oscillating wiper blade of a windshield wiper device. The counting unit is configured to detect oscillating movements of the wiper blade one at a time. The counting unit is configured such that an oscillating number of the wiper blade is accumulatively increased. The indicating unit indicates a warning under control of the counting unit when the oscillating number comes to a predetermined value. The electrical source supplies an electrical power to the counting unit and the indicating unit.

15 Claims, 12 Drawing Sheets

FOREIGN PATENT DOCUMENTS

| | | | |
|---|---|---|---|
| FR | 2843083 A1 | 8/2008 |
| JP | 2000-507902 A | 6/2000 |
| JP | 2009-056958 A | 3/2009 |
| KR | 20-0202621 | 8/2000 |
| KR | 10-2003-0037357 A | 5/2003 |
| KR | 10-0444019 | * | 8/2004 |
| KR | 100444019 B1 | 8/2004 |
| KR | 10-2004-0107645 A | 12/2004 |
| WO | 2004066330 A1 | 8/2004 |

OTHER PUBLICATIONS

FR2843083A1 (machine translation), 2004.*
European Search Report in corresponding European Patent Application No. 10163068.9, dated Apr. 11, 2012—6 pages.
Office Action issued by Korean Intellectual Property Office on Jan. 21, 2011 in the corresponding Korean patent application, 4 pages.
Decision to Grant, dated Feb. 24, 2012, to corresponding JP application 2010-113054, No English translation available, 3 pages.

* cited by examiner

WARNING INDICATOR FOR USE WITH WIPER BLADES, METHOD OF OPERATING THE SAME AND WIPER BLADE WITH A WARNING INDICATOR

CROSS-REFERENCE TO RELATED APPLICATIONS

This application claims priority from Korean Patent Application No. 10-2009-0043752 (filed on May 19, 2009), the entire subject matter of which is incorporated herein by reference.

TECHNICAL FIELD

The present disclosure relates to a warning indicator attached to an oscillating object to indicate a warning after the object oscillates numerous times. More particularly, the present disclosure relates to a warning indicator attached to a wiper blade for a windshield wiper device to indicate a warning after the wiper blade oscillates numerous times.

BACKGROUND

Motor vehicles are equipped with a windshield wiper device for wiping a surface of a windshield. The windshield wiper device may typically include a driving motor, a wiper arm and a wiper blade positioned on the surface of the windshield.

The driving motor functions to produce an oscillating movement. The wiper arm is coupled to a rotating shaft of the driving motor at its base end. The wiper blade is detachably joined to a distal end of the wiper arm. A component for biasing the distal end of the wiper arm toward the windshield is provided at the base end of the wiper arm. Thus, the wiper blade is placed in close contact with the windshield surface under the biasing force of the wiper arm and wipes the windshield surface while sliding thereon by oscillating movements produced by the driving motor.

The wiper blade typically has an elongated wiper strip and a frame component for attaching the wiper strip therealong and supporting the same thereon. The wiper strip may be made of a rubber-like material and be placed in contact with the windshield surface. The frame component may include an assembly having a plurality of yokes, or may include a single frame having a flat and elongated bar shape curved with a certain curvature. A wiper blade with a wiper frame of a yoke assembly is known in the art as "a yoke-type wiper blade," whereas a wiper blade of a single flat bar-shaped frame is known in the art as "a flat wiper blade" or "a flat bar wiper blade." One example of the yoke type wiper blade is illustrated in FIG. 1, while one example of the flat wiper blade is illustrated in FIG. 2.

Referring to FIG. 1, a yoke type wiper blade 10 includes: a wiper frame 12 having a main yoke 12a and a plurality of sub yokes 12b joined to the main yoke 12a in a bifurcated shape; and a wiper strip 11 attached to and supported by the sub yokes 12b. Referring to FIG. 2, a flat wiper blade 20 includes a flat bar frame 22 and a wiper strip 21 detachably fitted to an elongated slit defined in the flat bar frame 22 along a length direction thereof. The wiper blade 10, 20 is pivotally coupled to a distal end 31 of a wiper arm 30 at a middle section of the main yoke 12a or the frame 22.

The wiper strip 11, 21, which is equipped to the wiper blade 10, 20, has an inverted triangular cross-sectional shape at its edge. The wiper strip 11, 21 is placed in contact with a windshield surface along a tip edge 11a, 21a of such an inverted triangular cross-sectional shape. As the wiper blade 10, 20 is oscillated by the wiper arm 30 along with the operation of the drive motor of the windshield wiper device, the tip edge 11a, 21a of the wiper strip 11, 21 continues to wear out due to its slide contact to the windshield surface. Such wear might not occur constantly or uniformly along the tip edge 11a, 21a of the wiper strip 11, 21. Thus, after considerable wear, the tip edge 11a, 21a of the wiper strip 11, 21 is not placed in close contact with the windshield surface, but rather with any gap therebetween or any space coming off the windshield surface. Accordingly, when such a worn-out wiper strip is used, the windshield surface could not be wiped well and drivers could not clearly observe forward in a rainy or snowy weather. This may cause a traffic accident. To prevent such an event, the wiper strip (or the wiper blade with the wiper strip) needs to be replaced with a new one at an appropriate time.

As one example of prior art technologies addressing such a need, Korean Registered Utility Model Publication No. 20-0202621 suggests a wiper blade having a wiper strip with a replacement indicating protrusion adjacent to a tip edge of the wiper strip. This reference teaches users or drivers to make sure that the tip edge of the wiper strip has worn out up to the replacement indicating protrusion with his/her naked eyes.

However, it causes inconvenience to users or drivers to make sure how much the wiper strip has worn out with the naked eye. That is, users or drivers must swing up the wiper blade and then check the wear extent of the wiper strip. This causes considerable inconvenience to them. Further, when users or drivers forget to check the wear extent of the wiper strip, they cannot be aware that the wiper blade continues to wear out beyond a certain permissible limit and thus would miss an appropriate replacement timing of the wiper blade. As a result, they cannot help but to drive motor vehicles with considerably worn wiper blades not replaced.

SUMMARY

According to various aspects, numerous embodiments of a warning indicator for use with wiper blades are provided. In one exemplary embodiment, by way of non-limiting example, the warning indicator includes a housing, a counting unit, an indicating unit and an electrical source. The housing is configured to be coupled to an oscillating wiper blade of a wiper device. The counting unit is disposed in the housing and is configured to detect oscillating movements of the wiper blade one at a time. The counting unit is configured such that an oscillating number of the wiper blade is accumulatively increased. The indicating unit is exposed on the housing. The indicating unit indicates a warning under control of the counting unit when the oscillating number comes to a predetermined value. The electrical source is disposed in the housing and supplies an electrical power to the counting unit and the indicating unit. The counting unit includes a signal generating unit and a control unit. The signal generating unit is disposed in the housing as in connection with the electrical source. The signal generating unit is configured to generate a signal during a one time oscillating movement of the wiper blade. The control unit is connected to the signal generating unit. The control unit is configured to increase the oscillating number by one when the signal is inputted. The indicating unit is controlled by the control unit.

A further aspect relates to a method of operating the above-described warning indicator. According to an exemplary embodiment of the method, a wiper blade is oscillated by a plurality of times. A signal is generated by the signal generating unit during each oscillating of the wiper blade. It is determined by the control unit whether the signals from the signal generating unit are inputted in a predetermined time period and by a predetermined number. The oscillating number is accumulatively increased by the control unit in response to subsequent signals from the signal generating unit when the signals are inputted in the predetermined time period and by the predetermined number. According to another exemplary embodiment of the method, a plurality of signals is inputted to the control unit by the signal generating unit. A time period and interval of the plurality of the signals are compared with a predetermined time period and interval by the control unit. The oscillating number is accumulatively increased in response to subsequent signals from the signal generating unit when the time period and interval of the plurality of the signals coincide with the predetermined time period and interval. The oscillating number is increased by a number of the signals by the control unit.

A still further aspect relates to a wiper blade. In an exemplary embodiment, the wiper blade includes an elongated wiper strip, a wiper frame and the above-described warning indicator. The wiper blade is configured to contact a surface of a windshield of a motor vehicle. The wiper frame attaches and supports the wiper strip. The warning indicator is fixed to the wiper frame.

The Summary is provided to introduce a selection of concepts in a simplified form that are further described below in the Detailed Description. This Summary is not intended to identify key features or essential features of the claimed subject matter, nor is it intended to be used to determine the scope of the claimed subject matter.

BRIEF DESCRIPTION OF THE DRAWINGS

Arrangements and embodiments may be described in detail with reference to the following drawings in which like reference numerals refer to like components and wherein.

DETAILED DESCRIPTION

A detailed description may be provided with reference to the accompanying drawings. One of ordinary skill in the art may realize that the following description is illustrative only and is not in any way limiting. Other illustrative embodiments may readily suggest themselves to such skilled persons having the benefit of this disclosure.

Figure 3:
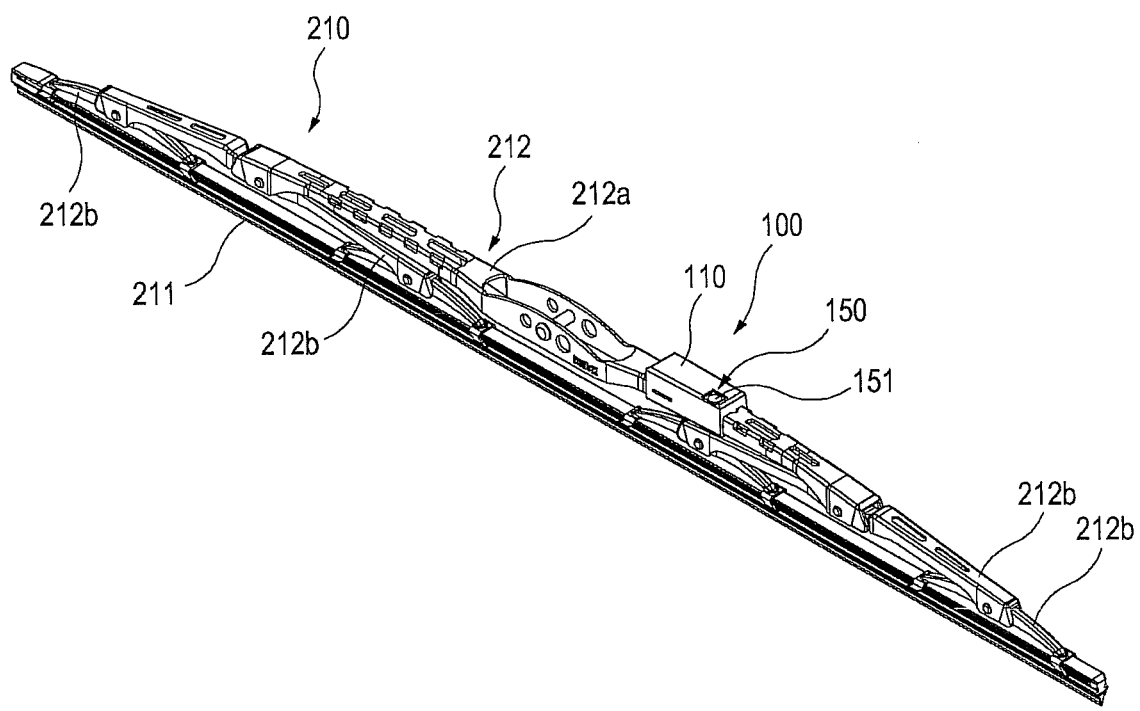
FIG. 3 is a perspective view illustrating a yoke type wiper blade with a warning indicator according to the present disclosure.
Figure 4:
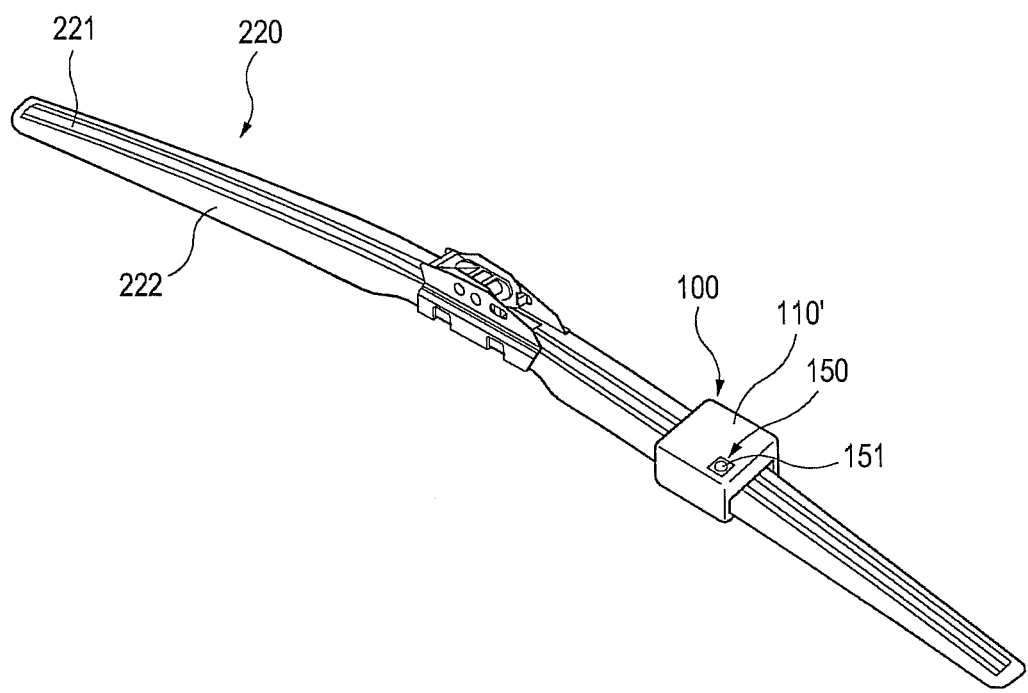
FIG. 4 is a perspective view illustrating a flat wiper blade with a warning indicator according to the present disclosure.

FIGS. 3 and 4 illustrate wiper blades with a warning indicator for use with wiper blades (hereinafter, this is simply referred to as "a warning indicator"). The warning indicator 100 constructed according to the present disclosure is coupled or attached to a wiper blade 210, 220 to count the number of oscillating movements of the wiper blade 210, 220. Further, the warning indicator 100 functions to inform users of a replacement timing of the wiper blade 210, 200 or a wiper strip 211, 221. The warning indicator 100 includes a housing 110, 110' configured to be coupled to the wiper blade 210, 220.

Figure 1:
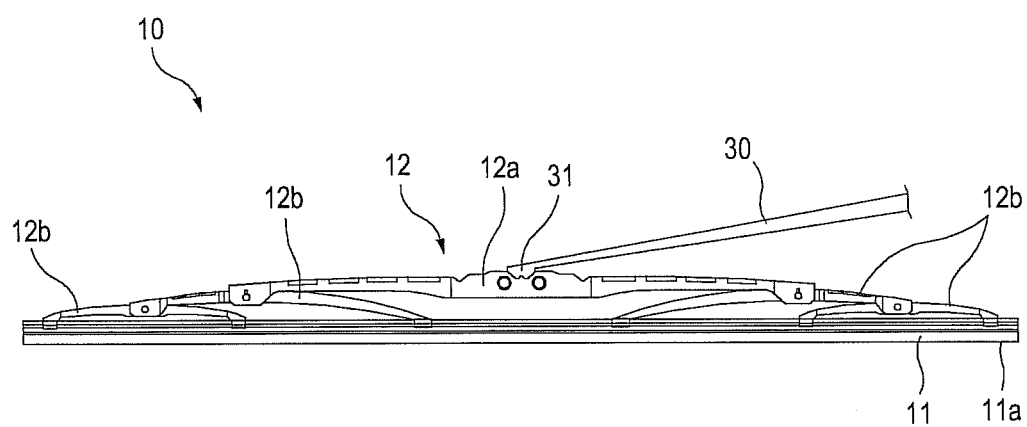
FIG. 1 is a side elevational view illustrating a conventional yoke type wiper blade.
Figure 2:
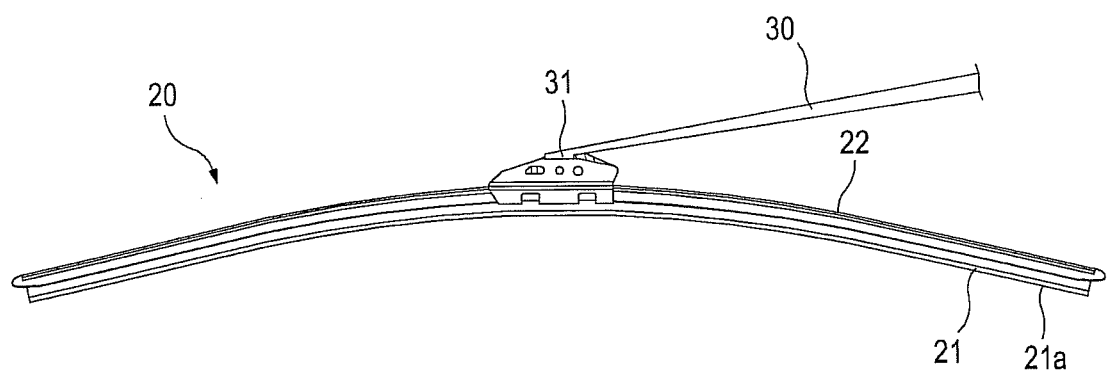
FIG. 2 is a side elevational view illustrating a conventional flat wiper blade.

The wiper blade, to which the warning indicator 100 can be coupled or mounted, may include, but is not limited to, a conventional yoke type wiper blade similar to that in FIG. 1 or a conventional flat wiper blade similar to that in FIG. 2. In other embodiments, the warning indicator 100 may be applied to all wiper blades that are available in the market.

The yoke type wiper blade 210 shown in FIG. 3 includes an elongated wiper strip 211 of a rubber-like material and a wiper frame 212 for carrying and attaching the wiper strip thereon. The wiper frame 212 includes a single main yoke 212a and a plurality of sub-yokes 212b linked or joined to the main yoke 212a in a bifurcated shape. In an example illustrated in FIG. 3, the warning indicator 100 is fixed to the main yoke 212a via the housing 110. The housing 110 may be coupled to the main yoke 212a in a snap-engagement manner, for example.

The flat wiper blade 220 shown in FIG. 4 includes a wiper strip 221 and a single elongated flat bar 222 for carrying and attaching the wiper strip 221 thereon. The flat bar 222 is configured to curve at a predetermined radius of curvature or be substantially flat. In an example illustrated in FIG. 4, the warning indicator 100 is fixed to the flat bar 222 via the housing 110'. The housing 110' is configured to be coupled to the flat bar 222 with a certain gap or space therebetween. The gap or space is for fitting the wiper strip 221 to the flat bar 222. The housing 110' may be coupled to the flat bar 222 in a snap-engagement or fit-engagement manner, for example.

Referring back to FIGS. 3 and 4, the warning indicator 100 includes an indicating unit 150 that is exposed or appears on the housing 110, 110'. The indicating unit 150 functions to indicate a warning when an oscillating number of the wiper blade 210, 220 comes to or reaches predetermined values. In embodiments illustrated in FIGS. 3 and 4, the indicating unit 150 includes a multi-colored LED (Light Emitting Diode) 151 flickering in green and red. For example, when the oscillating number of the wiper blade 210, 220 reaches the predetermined values, the warning indicator 100 flickers the multi-colored LED 151 to inform users of a warning associated with replacement of the wiper blade 210, 220.

Figure 5:
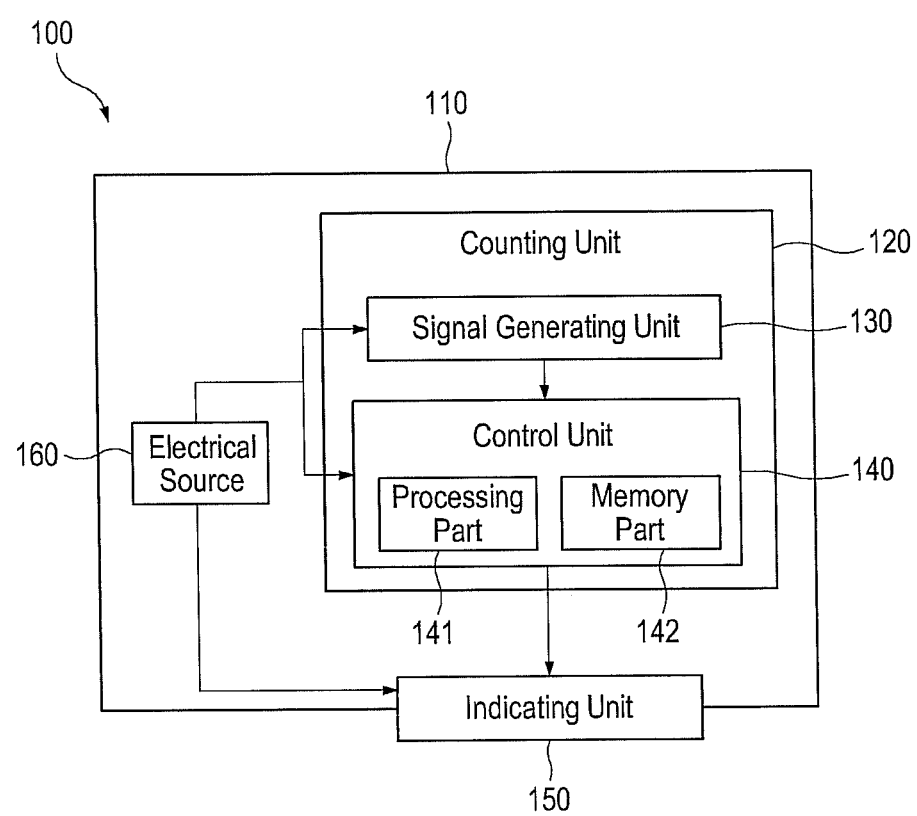
FIG. 5 is a block diagram schematically illustrating a constitution of a warning indicator according to one embodiment of the present disclosure.
Figure 6:
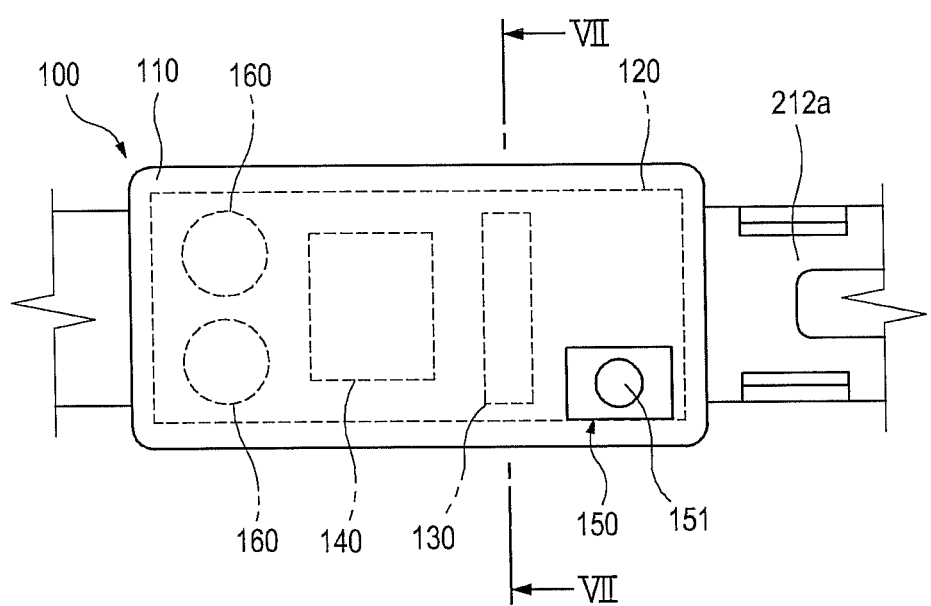
FIG. 6 is a plan view schematically illustrating an internal configuration of a warning indicator according to one embodiment of the present disclosure.

FIG. 5 is a block diagram schematically illustrating a constitution of the warning indicator 100 according to one embodiment. FIG. 6 is a plan view schematically illustrating an internal configuration of the warning indicator 100. Referring to FIGS. 5 and 6, the warning indicator includes the following: the housing 110, 110' configured to be coupled or mounted to the main yoke 212a or the flat bar 222 of the wiper blade 210, 220; a counting unit 120 disposed in the housing 110, 110' for detecting a one-time oscillating movement of the wiper blade 210, 220 and accumulatively counting the oscillating number of the wiper blade; the indicating unit 150 controlled by the counting unit 120 for indicating a warning to users; and an electrical source 160 for supplying an electrical power to the counting unit 120 and the indicating unit 150.

Figure 7:
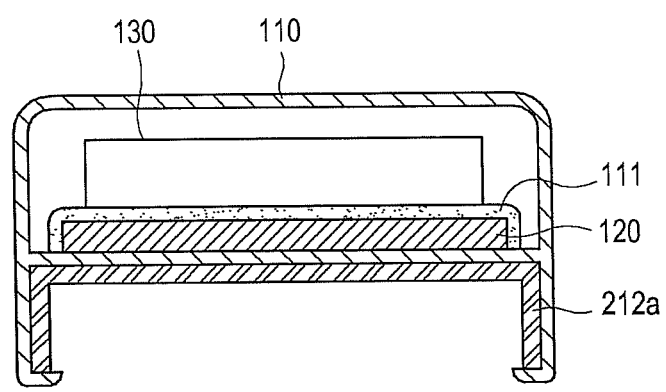
FIG. 7 is a sectional view taken along the line of FIG. 6.

The counting unit 120 is configured to detect a one-time oscillating movement of the wiper blade 210, 220 to generate a signal. Further, the counting unit 120 is configured to accumulatively count or increase the oscillating number of the wiper blade. The counting unit 120 includes a signal generating unit 130 and a control unit 140. The signal generating unit 130 is configured to generate electrical signals. The control unit 140 is configured to receive the signals from the signal generating unit 130 and to accumulatively count the oscillating number and to operate the indicating unit 150 when the oscillating number comes to predetermined warning oscillating numbers. The counting unit 120 may be configured in the form of a printed circuit board and the signal generating unit 130 and the control unit 140 may be mounted on the printed circuit board. Generally, a wiper device may work in a rainy or snowy weather. Thus, to prevent the counting unit 120 from malfunctioning due to water, the printed circuit board may be entirely covered with a coating layer 111 of a waterproof material such as urethane within the housing 110, 110'(see FIG. 7).

The signal generating unit 130 is connected to the electrical source 160 as well as the control unit 140. The signal generating unit 130 is configured to generate the electrical signal during the one-time oscillating movement of the wiper blade 210, 220 and to transmit the generated signal to the control unit 140. In one embodiment, the signal generating unit 130 is configured to generate the electrical signal when the oscillating movement of the wiper blade changes. In other embodiments, the signal generating unit 130 may be configured to generate the electrical signal while the wiper blade 210, 220 moves or pivots in one direction.

The control unit 140 is configured to accumulatively increase the oscillating number whenever the signals are inputted from the signal generating unit 130. For example, the control unit 140 is installed in the warning indicator 100, 100' as an initial value of the oscillating number is set to '0'. The control unit 140 accumulatively increases the oscillating number by '1' from the initial value whenever the signal is inputted. In one embodiment, the control unit 140 includes: a processing part 141 for performing a counting process; and a memory part 142 for storing the initial value of the oscillating number and values of the accumulatively increasing oscillating number.

Further, the control unit 140 is configured to operate the indicating unit 150 when the increasing oscillating number comes to the predetermined values. The predetermined values comprise a large number of warning oscillating numbers that increase at equal intervals. In this embodiment, the warning oscillating numbers may be defined as serial values increasing by one hundred such as 100 oscillating number, 200 oscillating number, 300 oscillating number, etc. The control unit 140 is configured to operate the indicating unit 150 at least one time whenever the increasing oscillating number reaches the warning oscillating numbers. Further, a maximum of the warning oscillating numbers may mean a permissible wear limit for the wiper strip 211, 221. In this embodiment, the maximum warning oscillating number is defined as an oscillating number of one hundred thousand. The control unit 140 is configured to operate the indicating unit 150 for a certain time period. The maximum warning oscillating number may be appropriately determined depending on a usage environment of wiper devices (e.g., climate).

The indicating unit 150, which may be controlled and operated by the control unit 140, indicates a warning whenever the oscillating number of the wiper blade 210, 220 reaches the warning oscillating numbers. Since the indicating unit 150 indicates the warning to users or drivers in light of the oscillating number of the wiper blade 210, 220, users or drivers can be immediately aware of usage extent of the wiper blade 210, 220.

The indicating unit 150 is configured to indicate a visible warning to users. In this embodiment, the indicating unit 150 includes the multi-colored LED 151. By way of an example, the multi-colored LED 151 is configured to flicker in green and red. The multi-colored LED 151 may be configured to flicker in green at least one time under the control of the control unit 140 when the oscillating number of the wiper blade 210, 220 reaches the warning oscillating numbers. The multi-colored LED 151 is configured to flicker in red for a certain time period when the oscillating number of the wiper blade 210, 220 reaches the maximum warning oscillating number.

The electrical source 160 may supply an electrical power to the signal generating unit 130, the control unit 140 and the indicating unit 150. In one embodiment, the electrical source 160 may include, but is not limited to, a replaceable battery such as small mercury batteries. The electrical source 160 may be provided at the warning indicator 100 in such a manner that it is mounted on the printed circuit board constituting the counting unit 120.

Figure 8:
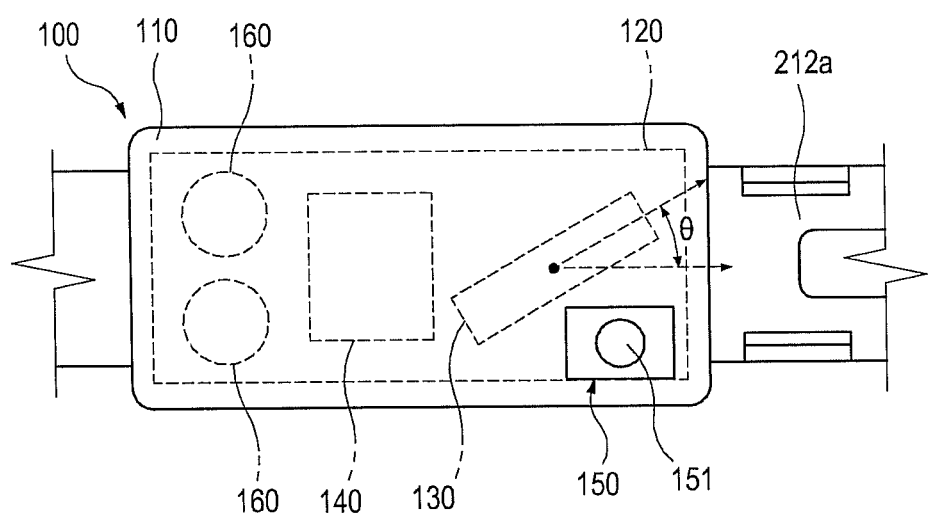
FIG. 8 is a plan view illustrating that a signal generating unit is placed in another orientation.
Figure 9:
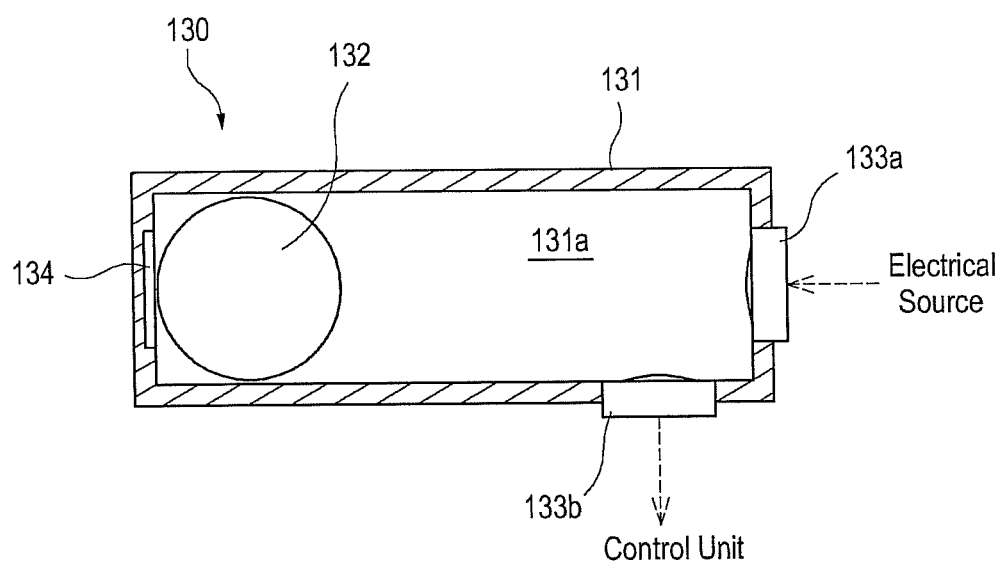
FIG. 9 is a schematic sectional view illustrating a signal generating unit according to one embodiment.
Figure 10:
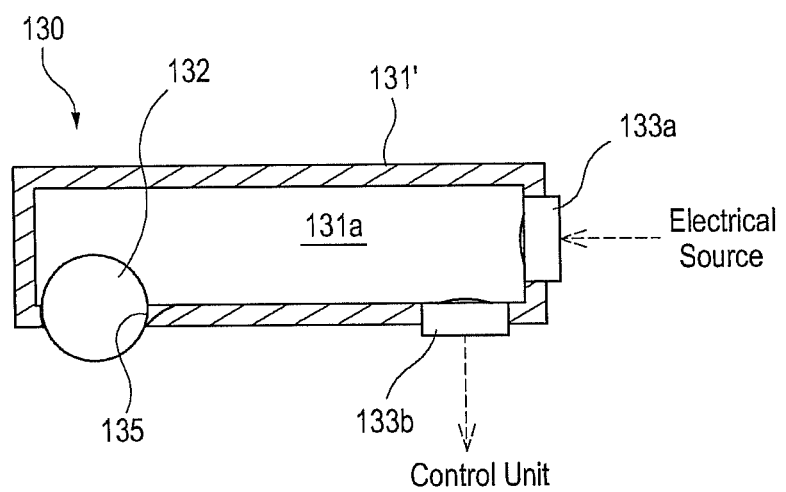
FIG. 10 is a schematic sectional view illustrating a signal generating unit according to another embodiment.

FIG. 8 is similar to FIG. 6 and shows that the signal generating unit is placed in another orientation. FIGS. 9 and 10 are schematic sectional views and show the signal generating unit 130. With reference to FIGS. 5 to 10, the signal generating unit 130 will be described in further detail.

As noted above, the signal generating unit 130 is configured to generate an electrical signal in every oscillating movement of the wiper blade 210, 220. In one embodiment, the signal generating unit 130 includes the following: a race 131a having a predetermined length; a mover (e.g., a metallic ball 132) movable between a first position and a second position on the race 131a; and a first electrical contact 133a and a second electrical contact 133b configured to electrically contact each other by contact to the mover. The race 131 a may be oriented perpendicularly to or at a certain angle to a length direction of the wiper blade 210, 220. The first position is defined as a position where the mover stands by or remains stationary when the wiper blade 210, 220 does not move or pivot. The second position is defined as a position where electrical contact is made between the mover and the electrical contacts to generate the electrical signal during the oscillating movements of the wiper blade 210, 220.

Further, in one embodiment, the signal generating unit 130 includes an elongated tubular member 131, 131'. The tubular member 131, 131' may be configured such that its interior space defines the race 131a. The tubular member 131, 131' may be oriented perpendicularly to the length direction of the wiper blade 210, 220 (e.g., a vertical position in FIG. 6). Also, the tubular member 131, 131' may be obliquely oriented at a certain angle θ relative to the length direction of the wiper blade 210, 210' (see FIG. 8). Both opposite ends of the tubular member 131, 131' may be at least partially closed. One of the opposite ends may become the first position, while the other of the opposite ends may become the second position.

In the descriptions provided below, a left end of the tubular member 131, 131' shown in FIGS. 9 and 10 is defined as the first position, while a right opposite end of the tubular member 131, 131' is defined as the second position. Further, a position wherein the wiper blade 210, 220 remains stationary prior to its oscillating movement is referred to as a standby position. A position wherein the oscillating movement of the wiper blade 210, 220 changes during the reciprocating movement is referred to as a turnaround position.

The mover may be made from an electrically conductible material. Further, the mover is configured to slide in an interior space of the tubular member 131, 131' (i.e., race 131a). In this embodiment, the mover includes a metallic ball 132. The metallic ball 132 stays in the first position in the standby position of the wiper blade 210, 220. In the second position, the first electrical contact 133a and the second electrical contact 133b are located closely to each other. By way of an example, the first electrical contact 133a is connected to the electrical source 160, while the second electrical contact 133b is connected to the control unit 140. The metallic ball 132 moves from the first position to the second position when the wiper blade 210, 220 pivots in one direction. Further, the metallic ball 132 returns from the second position to the first position when the wiper blade 210, 220 pivots in an opposite direction. Thus, the metallic ball 132 and the first and second electrical contacts 133a, 133b are brought in contact with each other during the oscillating movement of the wiper blade 210, 220. This forms an electrical circuit, wherein the electrical source 160, the signal generating unit 130 and the control unit 140 are connected to one another to transmit the electrical signal to the control unit 140.

According to the above-described configuration of the signal generating unit 130 according to one embodiment, the metallic ball 132 stays in the first position when the wiper blade 210, 220 is in the standby position. To this end, the tubular member 131, 131' is oriented such that its one end faces toward the ground. That is, in case of the orientation of the signal generating unit 130 shown in FIG. 6, the tubular member 131, 131' is placed with its left end facing toward the ground. Further, in case of the orientation of the signal generating unit 130 shown in FIG. 8, the tubular member 131, 131' is obliquely placed at an acute angle to the wiper blade 210, 220 with its left end facing toward the ground. Thus, the metallic ball 132 can stay in the first position without any movement in the standby position of the wiper blade 210, 220.

The oscillating movement of the wiper blade 210, 220 in one direction continues to change the orientation of the tubular member 131, 131'. By way of an example, when the signal generating unit 130 is disposed as shown in FIG. 6, as the wiper blade 210, 220 pivots at an obtuse angle, the orientation of the tubular member 131, 131' changes from a vertical orientation through a horizontal orientation to an oblique orientation accordingly. During movement from the horizontal orientation to the oblique orientation, a gravitational force moves the metallic ball 132 to the second position. Then, the electrical circuit is formed by the metallic ball 132, which is moved to the second position, and the signal generating unit 130 makes electrical signal generation. If the wiper blade returns from the oblique orientation through the horizontal orientation to the vertical orientation, then the metallic ball 132 returns from the second position to the first position under the gravitational force.

By way of another example, in case the signal generating unit 130 is disposed as shown in FIG. 8, the tubular member 131, 131' is already oriented at a predetermined angle θ relative to the wiper blade 210, 220. Thus, even if the wiper blade 210, 220 does not pivot from the orientation shown in FIG. 8 to a vertical position, the metallic ball 132 can be moved to the second position. With this arrangement, the warning indicator 100 can be easily installed to wiper devices, which may include the wiper blade 210, 220 having a narrow range of oscillating movement (e.g., less than 90 degrees). The predetermined angle θ may be determined depending on how wiper devices including wiper blades with the warning indicator 100 are installed. For example, the predetermined angle θ may be determined so that the mover (e.g., metallic ball 132) can stay in the first position in the standby position of the wiper blade.

Further, some motor vehicles may employ a wiper device configured to oscillate its wiper blade between a horizontal standby position and a vertical turnaround position therebelow, or a wiper device configured to oscillate its wiper blade between a vertical standby position and a horizontal turnaround position therebelow. Those wiper devices may also include the warning indicator 100 with the signal generating unit 130 oriented as shown in FIGS. 6 and 8.

When motor vehicles pass over speed bumps or run on dirt or unpaved roads, uphill or downhill roads, vibration or impact exerted to the motor vehicles can unintentionally cause the metallic ball 132 to move away from the first position to the second position. In such a case, the signal generating unit 130 can generate the electrical signal, although the wiper device does not work. Further, the control unit 140 can also increase the oscillating number in vain. To cope with such a situation or to retain the mover to the first position more firmly, a component for retaining the mover to the first position may be provided in the tubular member 131, 131', as illustrated in FIGS. 9 and 10.

By way of an example of such a component, as shown in FIG. 9, the signal generating unit 130 may have a magnetic member (e.g., magnet 134) at the left end of the tubular member 131 (e.g., adjacent to the first position). Thus, in the standby position of the wiper blade, the metallic ball 132 can be retained in the first position by a magnetic attraction of the magnet 132. By way of another example of such a component, as shown in FIG. 10, the signal generating unit 130 may have a seat hole or seat aperture 135, on which the metallic ball 132 can be seated or fitted, adjacent to the left end of the tubular member 131'. The magnet 134 or the seat hole 135 may allow the metallic ball 132 to retain in the first position in the standby position of the wiper blade. The magnetic attraction of the magnet 134 is determined such that the metallic ball 132 can move away from the first position during the oscillating movements of the wiper blade.

In another embodiment of the component for retaining the metallic ball 132 to the first position, a stopper (not shown), which is resiliently operable to stop the metallic ball 132 in the first position, may be provided in the one end of the tubular member 131, 131'. That is, the metallic ball 132 can be retained in the first position by a resilient force of such a stopper and can move against the resilient force of the stopper by its centrifugal force to move away from the first position during the oscillating movement of the wiper blade.

The mover may be configured to be otherwise than described above. For example, the mover may comprise a cylinder of an electrically conductible material, which is slidable within the tubular member 131, 131'.

Figure 11:
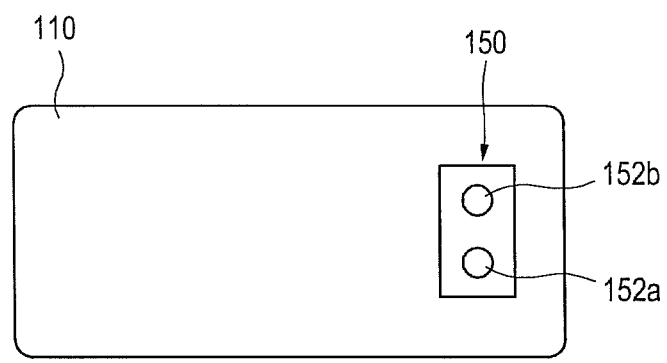
FIG. 11 is a plan view of a warning indicator with an indicating unit according to another embodiment.

In another embodiment, the indicating unit 150 may include two mono-colored LEDs 152a, 152b, as shown in FIG. 11. By way of example, a red LED 152a and a green LED 152b may be used. In such a case, the control unit 140 may be configured to flicker the green LED 152b at least one time whenever the oscillating number comes to the warning oscillating numbers and to continuously flicker the red LED 152a when the oscillating number comes to the maximum oscillating number. While the multi-colored LED or the mono-colored LEDs emitting red or green are described hereinbefore, it should be noted that any LEDs configured to emit distinguishable colors such as red, blue, etc. may be employed.

Figure 12:
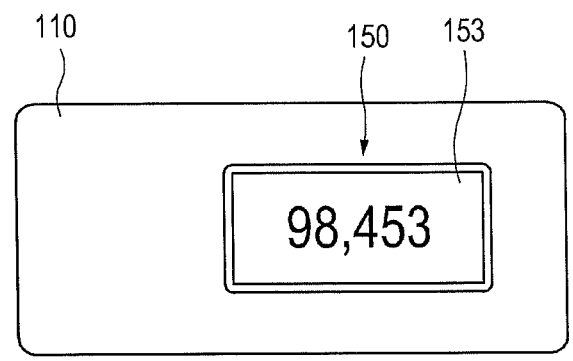
FIG. 12 is a plan view of a warning indicator with an indicating unit according to yet another embodiment.

The indicating unit 150 may include a liquid crystal display 153, as shown in FIG. 12. In such a case, the control unit 140 may be configured to indicate the accumulatively increasing oscillating number as numerical characters by means of the liquid crystal display 153 irrespective of the warning oscillating number.

In the embodiments shown in FIGS. 3 and 4, the indicating unit 150 appears or is exposed on the upper side of the housing 110, 110'. In another embodiment, the indicating unit 150 may be exposed on the housing 110, 110' at a location where drivers or users can take an easy look at the indicating unit (e.g., at a lateral side of the housing facing the driver).

An example operation of the above-described warning indicator 100 according to one embodiment will now be described according to a hibernation mode and an activation mode.

The hibernation mode is an operating mode wherein the warning indicator 100 is not yet used as a new or recycled product and an oscillating number is set to '0'. The warning indicator 100 in the hibernation mode may be supplied to users as coupled to or separated from the wiper blade 210, 220.

The wiper blade 210, 220 with the warning indicator 100 in the hibernation mode mounted thereto may be oscillated or reciprocatingly swung several times (e.g., three to five times) within an angular range in which the signal generating unit 130 can generate the signal. Such oscillating movement allows generally regular or periodic signals to be inputted from the signal generating unit 130 to the control unit 140 by said several times. The control unit 140 may be configured to change from the hibernation mode into the activation mode, and at the same time, to operate the indicating unit 150 for predetermined several times (e.g., about five times) to inform users of its operation beginning when such several regular signals are inputted. To this end, the control unit 140 may be pre-programmed so as to change from the hibernation mode to the activation mode and to operate the indicating unit 150 for several times when such several regular signals are inputted for a predetermined time period (e.g., three or five times). Further, the control unit 140 may be pre-programmed so as to continue its hibernation mode, if the several signals are not inputted regularly in the hibernation mode according to the above-described condition. As such, the swing of the wiper blade can allow the warning indicator 100 to begin its operation. Thus, the warning indicator 100 can be set to the activation mode without any power switch that may be provided thereto. Users can be aware of a mode change into the activation mode in the warning indicator 100 through the indicating unit 150 and then may couple the wiper blade 210, 220 to the wiper arm 30.

In the activation mode of the warning indicator 100, the control unit 140 accumulatively increases the oscillating number by interaction or cooperation between the processing part 141 and the memory part 142 when the signal from the signal generating unit 130 is inputted (e.g., whenever the wiper blade oscillates one time).

In one embodiment, the activation mode includes a waiting mode, a judging mode, a counting mode and an indicating mode. Functions and operations associated with those modes may be pre-programmed into the control unit 140. In the waiting mode, the control unit 140 may await the signal input from the signal generating unit 130. In the judging mode, the control unit 140 judges whether or not the signal input from the signal generating unit 130 is normal such that the control unit 140 does not miscount due to a signal input irrelevant to the oscillating movement of the wiper blade 210, 220 (e.g., some signals to be generated when motor vehicles pass over speed bumps or run on dirt or unpaved roads). In the counting mode, when the signal is inputted from the signal generating unit 130 to the control unit 140 as judged in the judging mode (e.g., whenever the wiper blade normally oscillates one time), the control unit 140 accumulatively counts the oscillating number by cooperation of the processing part 141 and the memory part 142. In the indicating mode as described above, the indicating unit 150 is operated at least one time whenever the oscillating number comes to the warning oscillating numbers. Also, the indicating unit 150 is operated continuously or a predetermined time period when the oscillating number reaches the maximum warning oscillating number.

If the signal input is made from the signal generating unit 130 during awaiting in the waiting mode, then the warning indicator 100 transitions to the judging mode. In the judging mode, the control unit 140 judges a time period and interval of signal inputs made throughout several times from the signal generating unit 130. For example, when considering an actual example operation of the wiper blade 210, 220, wiper arms are oscillated or reciprocatingly swung in a regular period by windshield wiper devices. Accordingly, by using a time period and interval of signals generated through such periodic oscillating movement, it can be judged whether or not the wiper blade 210, 220 normally works. In addition, when wiping the windshield with a cleansing solution, the windshield wiper devices may operate regularly for several times and then stop. To cope with such a situation, the control unit 140 compares the time period and interval of the signals, which are inputted several times during the awaiting in the waiting mode, with a predetermined time period and interval to thereby judge whether or not the wiper blade 210, 220 operates normally. Said predetermined time period and interval may be preset diversely depending on windshield wiper devices (e.g., three times signal inputs within thirty seconds). If operation associated with the signal inputs is judged as a normal operation through the judging mode, then the warning indicator 100 transitions to the counting mode and counts or increases the oscillating number accumulatively one at a time in response to subsequent signal inputs from the signal generating unit 130. In transition from the judging mode to the counting mode, the control unit 140 performs the counting mode after increasing the oscillating number by the number of signals inputted in the judging mode. As such, the judging mode can prevent miscount that can be caused by some signals inputted from the signal generating unit 130 irrespective of the normal wiping operation of the wiper blade.

When the oscillating number comes to each of the warning oscillating numbers in the counting mode, the warning indicator 100 transitions to the indicating mode and then the control unit 140 operates the indicating unit 150 (e.g., multi-colored LED 151, mono-colored LED 152a, 152b) at least one time. Thus, the users can become aware that the warning indicator 100 is under a normal operation and performs a normal counting operation. In case the indicating unit 150 includes the multi-colored LED 151, the multi-colored LED 151 may be controlled by the control unit 140 so as to flicker in green. Further, in case the indicating unit 150 includes the mono-colored LEDs 152a, 152b, the indicating unit 150 may be controlled by the control unit 140 so as to operate the green LED 152b.

When the oscillating number comes to the maximum warning oscillating number in the counting mode, the warning indicator 100 transitions to the indicating mode and then the control unit 140 continuously operates the indicating unit 150. In case of the indicating unit 150 including the multi-colored LED 151, the multi-colored LED 151 may be controlled by the control unit 140 so as to continuously flicker in red. Further, in case of the indicating unit 150 including the mono-colored LEDs 152a, 152b, the indicating unit 150 may be controlled by the control unit 140 so as to continuously operate the red LED 152*a*. Furthermore, regarding continuously flickering, the indicating unit 150 may be operated until the electrical source 160 is fully exhausted.

According to embodiments of the warning indicator, if the wiper blade 210, 220 is used to the extent that it must be replaced with a new one, then the warning indicator 100 automatically indicates a visible or perceptible warning, thereby notifying users of the replacement timing of the wiper blade.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A warning indicator for use with wiper blades, the warning indicator being configured to operate in a hibernation mode and an activation mode, comprising:
    a housing configured to snap-engage a wiper frame of an oscillating wiper blade of a wiper device;
    a counting unit disposed in the housing and being configured to detect oscillating movements of the wiper blade one at a time, the counting unit being configured such that an oscillating number of the wiper blade is accumulatively increased;
    an indicating unit exposed on the housing for indicating a warning under a control of the counting unit when the oscillating number comes to a predetermined value; and
    an electrical source disposed in the housing for supplying an electrical power to the counting unit and the indicating unit,
    wherein the counting unit includes:
        a signal generating unit disposed in the housing in connection with the electrical source, the signal generating unit being configured to generate a signal during a one time oscillating movement of the wiper blade; and
        a control unit connected to the signal generating unit, the control unit being configured to increase the oscillating number by one when the signal is inputted,
    wherein the signal generating unit includes:
        an electrically conductible mover movable along a race of a predetermined length between a first position and a second position; and
        first and second electrical contacts disposed adjacent to one of the first and second positions, the first electrical contact being connected to the electrical source, the second electrical contact being connected to the control unit,
    wherein the indicating unit is controlled by the control unit,
    wherein a contact between the mover and the first and second electrical contacts generates the signal,
    wherein the signal generating unit is configured to generate the signal during each oscillating movement of the wiper blade in the hibernation mode, and
    wherein the control unit is configured to change from the hibernation mode, where the oscillating number is not increased by wiper blade oscillation, into the activation mode, where the oscillating number is increased by wiper blade oscillation, when the signals are inputted from the signal generating unit in a predetermined time period and by a predetermined number in the hibernation mode.

2. The warning indicator of claim 1 wherein the race is oriented perpendicularly to a length direction of a wiper blade.

3. The warning indicator of claim 1 wherein the race is oriented at an angle to a length direction of a wiper blade.

4. The warning indicator of claim 1, wherein the signal generating unit further includes a tubular member defining the race and the mover is slidably disposed within the tubular member.

5. The warning indicator of claim 4, wherein the first position comprises one end of the tubular member and the second position comprises an opposite end of the tubular member,
    wherein the tubular member includes a magnetic member at the one end thereof, and
    wherein the first and second electrical contacts are disposed adjacent to the opposite end of the tubular member.

6. The warning indicator of claim 4, wherein the first position comprises one end of the tubular member and the second position comprises an opposite end of the tubular member,
    wherein the tubular member includes a seat hole at the one end thereof, the seat hole being configured to seat the mover, and
    wherein the first and second electrical contacts are disposed adjacent to the opposite end of the tubular member.

7. The warning indicator of claim 1, wherein the indicating unit includes a multi-colored LED,
    wherein the predetermined value comprises a large number of warning oscillating numbers increasing at an equal interval, and
    wherein the control unit is configured to flicker the multi-colored LED at least one time in one color of the multi-colored LED when the oscillating number comes to the warning oscillating number and to flicker the multi-colored LED for a predetermined time period in said one color or other color of the multi-colored LED when the oscillating number comes to a maximum of the warning oscillating numbers.

8. The warning indicator of claim 1, wherein the indicating unit includes a first mono-colored LED and a second mono-colored LED,
    wherein the predetermined value comprises a large number of warning oscillating numbers increasing at an equal interval, and
    wherein the control unit is configured to flicker the first mono-colored LED at least one time when the oscillating number comes to the warning oscillating number and to flicker the second mono-colored LED for a predetermined time period when the oscillating number comes to a maximum of the warning oscillating numbers.

9. The warning indicator of claim 1, further comprising a printed circuit board with the counting unit and the electrical source mounted thereon, the printed circuit board being covered with a waterproof material within the housing.

10. A method of operating a warning indicator for use with wiper blades according to claim 1, comprising:
    oscillating a wiper blade by a plurality of times;
    generating a signal by the signal generating unit during each oscillating of the wiper blade;
    judging by the control unit whether the signals from the signal generating unit are inputted in a predetermined time period and by a predetermined number; and accumulatively increasing the oscillating number by the control unit in response to subsequent signals from the signal generating unit when the signals are inputted in the predetermined time period and by the predetermined number.

11. A method of operating a warning indicator for use with wiper blades according to claim 1, comprising:
inputting a plurality of signals to the control unit by the signal generating unit;
comparing a time period and interval of the plurality of the signals with a predetermined time period and interval by the control unit; and
accumulatively increasing the oscillating number by the control unit in response to subsequent signals from the signal generating unit when the time period and interval of the plurality of the signals coincide with the predetermined time period and interval.

12. The method of claim 11, wherein accumulatively increasing includes increasing the oscillating number by a number of the plurality of the signals by the control unit.

13. A wiper blade, comprising:
an elongated wiper strip configured to contact a surface of a windshield of a motor vehicle;
a wiper frame for attaching and supporting the wiper strip; and
a warning indicator according to claim 1, the warning indicator being fixed to the wiper frame.

14. The wiper blade of claim 13, wherein the wiper frame includes a main yoke and a plurality of sub yokes joined to the main yoke in a bifurcated shape.

15. The wiper blade of claim 13, wherein the wiper frame includes a single elongated flat bar.

* * * * *